(12) United States Patent
Sloterbeek (10) Patent No.: US 12,503,047 B2
(45) Date of Patent: Dec. 23, 2025

(54) DISPLAY MIRROR ASSEMBLY

(71) Applicant: GENTEX CORPORATION, Zeeland, MI (US)

(72) Inventor: Eric S. Sloterbeek, Hudsonville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 360 days.

(21) Appl. No.: 18/174,719

(22) Filed: Feb. 27, 2023

(65) Prior Publication Data

US 2023/0271552 A1     Aug. 31, 2023

Related U.S. Application Data

(60) Provisional application No. 63/314,527, filed on Feb. 28, 2022.

(51) Int. Cl.
*B60R 1/04* (2006.01)
*B60K 35/22* (2024.01)
*B60R 1/12* (2006.01)

(52) U.S. Cl.
CPC ............... *B60R 1/04* (2013.01); *B60K 35/22* (2024.01); *B60K 2360/785* (2024.01); *B60R 2001/1253* (2013.01)

(58) Field of Classification Search
CPC ............. B60R 1/04; B60R 2001/1253; B60R 2001/1215; B60R 1/00; B60R 1/088; B60R 2001/1223; B60R 1/12; B60R 11/04; B60K 35/60; B60K 2360/785; B60K 35/22

See application file for complete search history.

(56) References Cited

U.S. PATENT DOCUMENTS

| | | | |
|---|---|---|---|
| 5,928,572 | A | 7/1999 | Tonar et al. |
| 5,998,617 | A | 12/1999 | Srinivasa et al. |
| 6,020,987 | A | 2/2000 | Baumann et al. |
| 6,037,471 | A | 3/2000 | Srinivasa et al. |
| 6,137,620 | A | 10/2000 | Guarr et al. |

(Continued)

FOREIGN PATENT DOCUMENTS

| | | |
|---|---|---|
| CN | 210437013 U | 5/2020 |
| KR | 100613471 B1 | 8/2006 |

(Continued)

*Primary Examiner* — Alazar Tilahun
(74) *Attorney, Agent, or Firm* — Price Heneveld LLP; Brian James Brewer (57) ABSTRACT

A mirror assembly for a vehicle including a housing. An electro-optic assembly is located in the housing, the electro-optic assembly includes a partially reflective, partially transmissive front substrate. The front substrate defines a first surface and a second surface. A rear substrate defines a third surface and a fourth surface. An electro-optic medium is disposed between the front substrate and the rear substrate. A display module is located in the housing and a camera unit is located outside the housing and includes a camera. The camera is configured to capture an image. An electronic control unit ("ECU") is located in the housing and is configured to send instructions to the camera to capture the image and to generate information about the image on the display module. A flexible conductor is at least partially located in the housing and electrically coupled between the ECU and the camera.

20 Claims, 9 Drawing Sheets

(56) References Cited

U.S. PATENT DOCUMENTS

| | | | |
|---|---|---|---|
| 6,141,137 | A | 10/2000 | Byker et al. |
| 6,193,912 | B1 | 2/2001 | Thieste et al. |
| 6,249,369 | B1 | 6/2001 | Theiste et al. |
| 6,519,072 | B2 | 2/2003 | Nishikitani et al. |
| 8,201,800 | B2 | 6/2012 | Filipiak |
| 8,210,695 | B2 | 7/2012 | Roth et al. |
| 8,264,761 | B2 | 9/2012 | Cammenga et al. |
| 8,599,001 | B2 | 12/2013 | Schofield et al. |
| 8,643,931 | B2 | 2/2014 | Cammenga et al. |
| 8,646,924 | B2 | 2/2014 | Roth et al. |
| 8,814,373 | B2 | 8/2014 | Steel et al. |
| 8,827,517 | B2 | 9/2014 | Cammenga et al. |
| 8,885,240 | B2 | 11/2014 | Roth et al. |
| 8,925,891 | B2 | 1/2015 | Van Huis et al. |
| 8,960,629 | B2 | 2/2015 | Rizk et al. |
| 9,174,577 | B2 | 11/2015 | Busscher et al. |
| 9,244,249 | B2 | 1/2016 | Kim et al. |
| 9,316,347 | B2 | 4/2016 | Roth |
| 9,505,349 | B2 | 11/2016 | Fish, Jr. et al. |
| 9,838,653 | B2 | 12/2017 | Fish, Jr. et al. |
| 10,739,591 | B2 | 8/2020 | Lee et al. |
| 2014/0055837 | A1 | 2/2014 | Lee |
| 2021/0033255 | A1* | 2/2021 | Kuffner, Jr. ............ G01S 7/4972 |
| 2021/0291739 | A1 | 9/2021 | Kasarla et al. |
| 2021/0323473 | A1* | 10/2021 | Peterson ................. B60R 1/025 |

FOREIGN PATENT DOCUMENTS

| | | | |
|---|---|---|---|
| WO | 9842796 | A1 | 10/1998 |
| WO | 9902621 | A1 | 1/1999 |

* cited by examiner

DISPLAY MIRROR ASSEMBLY

CROSS-REFERENCE TO RELATED APPLICATION

This application claims priority to and the benefit under 35 U.S.C. § 119(e) of U.S. Provisional Application No. 63/314,527, filed on Feb. 28, 2022, entitled "FULL DISPLAY MIRROR ASSEMBLY," the disclosure of which is hereby incorporated herein by reference in its entirety.

BACKGROUND OF THE DISCLOSURE

The present disclosure generally relates to a rearview device system and, more particularly, a mirror assembly having an attached camera.

SUMMARY OF THE DISCLOSURE

According to one aspect of the present disclosure, a mirror assembly for a vehicle includes a housing and an electro-optic assembly is located in the housing. The electro-optic assembly includes a partially reflective, partially transmissive front substrate. The front substrate defines a first surface and a second surface. A rear substrate defines a third surface and a fourth surface. An electro-optic medium is disposed between the front substrate and the rear substrate. A display module is located in the housing, and a camera unit is located outside of the housing and includes a camera that is configured to capture an image. An electronic control unit ("ECU") is located in the housing and is configured to send instructions to the camera to capture the image and to generate information about the image on the display module. A flexible conductor is at least partially located in the housing and electrically coupled between the ECU and the camera.

According to another aspect of the present disclosure, a mirror assembly for a vehicle includes a housing and an electro-optic assembly is located in the housing. The electro-optic assembly includes a partially reflective, partially transmissive front substrate. The front substrate defines a first surface and a second surface. A rear substrate defines a third surface and a fourth surface. An electro-optic medium is disposed between the front substrate and the rear substrate. A vehicle bracket is spaced from the housing and includes a pocket wall defining a seat. A camera unit is located in the seat and includes a camera and an illumination element. The illumination element is configured to project a light in an infrared spectrum, and the camera is configured to capture an image within the infrared spectrum. An electronic control unit ("ECU") is located in the housing and is configured to receive the image from the camera unit and generate a signal to provide a notification to a vehicle operator based on the image. A flexible conductor is at least partially located in the housing and electrically coupled between the ECU and the camera.

According to yet another aspect of the disclosure, a mirror assembly for a vehicle includes a housing, and an electro-optic assembly is located in the housing. The electro-optic assembly includes a partially reflective, partially transmissive front substrate. The front substrate defines a first surface and a second surface. A rear substrate defines a third surface and a fourth surface. An electro-optic medium is disposed between the front substrate and the rear substrate. A camera unit is located outside of the housing and includes a camera configured to capture an image. An electronic control unit ("ECU") is located in the housing and is configured to receive the image from the camera unit and generate a signal to provide a notification to a vehicle operator based on the image. A flexible conductor is at least partially located in the housing and electrically coupled between the ECU and the camera. A mounting member is configured to attach the mirror assembly to a windshield or an overhead space of the vehicle. The mounting member includes a hollow interior, and the flexible conductor is at least partially located in the hollow interior.

According to still yet another aspect of the present disclosure, a method of assembling a mirror assembly and coupling the mirror assembly to a vehicle is provided. The method comprises the steps of electrically connecting a glass element, a display module, and a camera unit to a PCB. The camera unit is connected to the PCB by a flexible conductor and encloses the PCB, the glass element, the display module, and at least a portion of the flexible conductor within the housing, where the camera unit is located outside of the housing.

These and other features, advantages, and objects of the present disclosure will be further understood and appreciated by those skilled in the art by reference to the following specification, claims, and appended drawings.

DETAILED DESCRIPTION

The present illustrated embodiments reside primarily in combinations of method steps and apparatus components related to a mirror assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
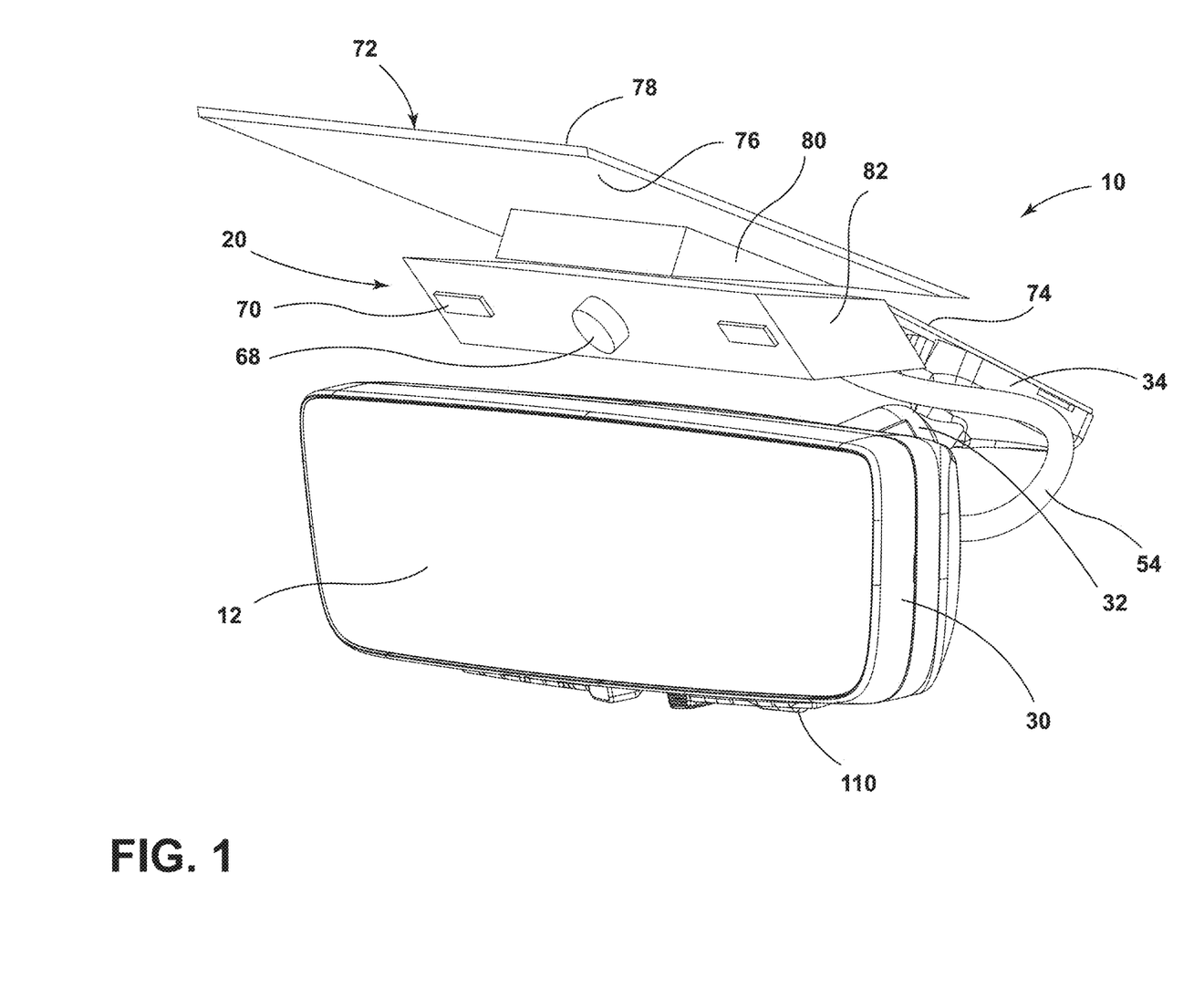
FIG. 1 is a front perspective view of a mirror assembly for a vehicle in accordance with an aspect of the present disclosure.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer of the mirror, and the term "rear" shall refer to the surface of the element further from the intended viewer of the mirror. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 2:
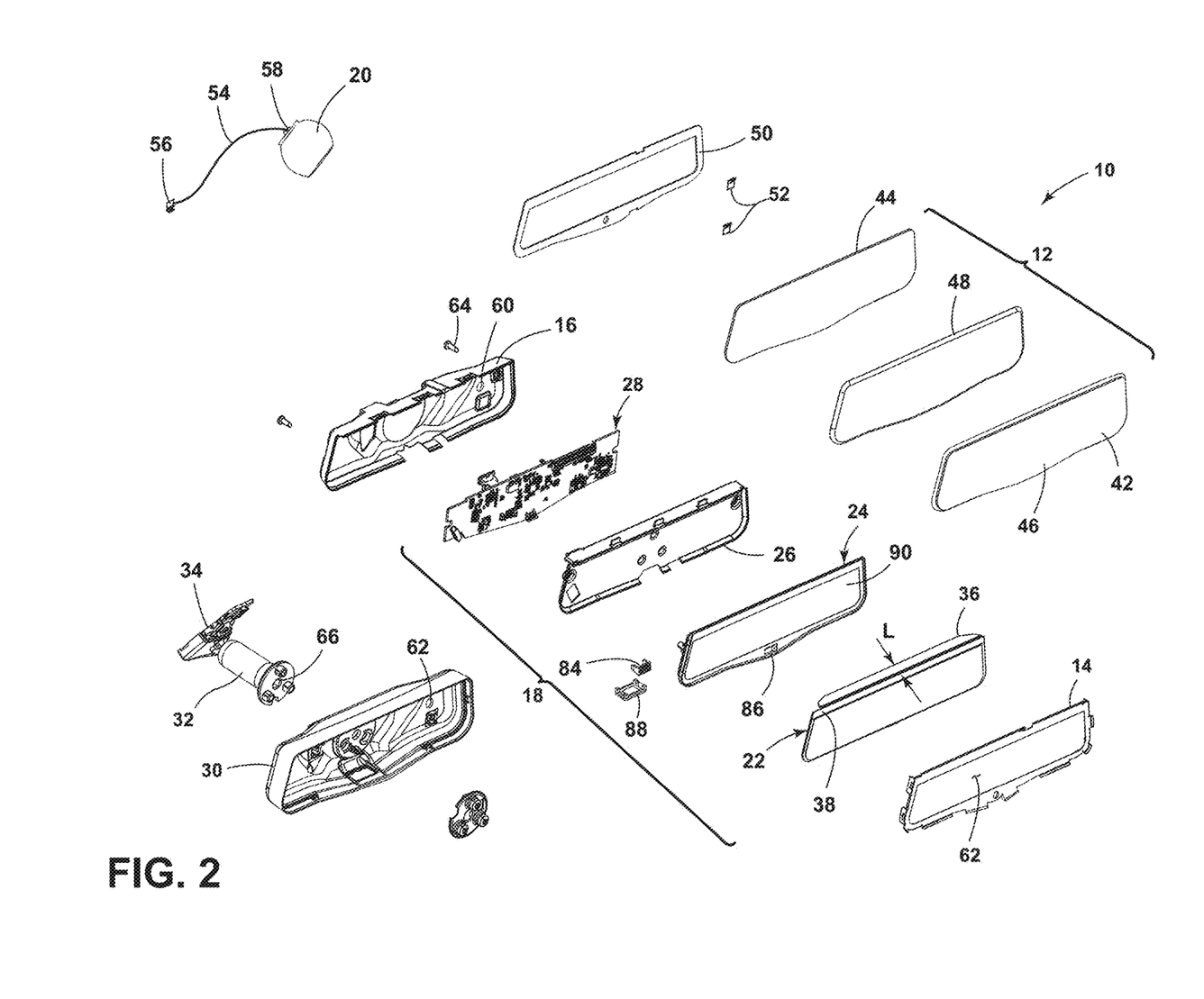
FIG. 2 is a disassembled top perspective view of a mirror assembly in accordance with an aspect of the present disclosure.

Referring now to FIGS. 1-2, reference numeral 10 generally designates a mirror assembly for a vehicle that includes a reflective state and a display state. In the reflective state, the mirror assembly 10 operates as a mirror, reflecting light at various wavelengths back towards an intended viewer. In the display state, the mirror assembly 10 relays information (e.g., a message or recommendation) to a vehicle operator. The mirror assembly 10 includes a partially reflective, partially transmissive element 12 (also referred to as a "glass element" herein) and a display module 18 that is viewed through the glass element 12. As shown in FIG. 2, the mirror assembly 10 further includes a front shield 14 and a rear shield 16 which shield and support the glass element 12 and the display module 18. The mirror assembly 10 further includes a camera unit 20 for capturing an image of an interior cabin of a vehicle. As will be appreciated, the camera unit 20 utilizes a same control system 200 as the other components of the mirror assembly 10 but is flexibly connected relative to the glass element 12 to permit positioning and attachment of the camera unit 20 in various locations in and around a vehicle with respect to the glass element 12.

Referring to FIG. 2, the mirror assembly 10 for a vehicle is shown with the components in a partially unassembled state. A housing 30 at least partially receives the front shield 14, the display module 18, and the rear shield 16, and includes a mounting member 32 extending rearward therefrom. The mounting member 32 includes a mount plate 34 that is adapted for mounting on a windshield or overhead space of a vehicle. The housing 30 may be configured to be part of the outer profile of the glass element 12. During use, the mirror assembly 10 (e.g., the housing 30) may be articulated between a variety of positions. However, because the camera unit 20 is spaced from and statically positioned within the vehicle, the orientation of the housing 30 does not impact the orientation and consistency of the image captured by the camera unit 20. In this manner, in embodiments where the control system 200 is configured to extract three-dimensional ("3D") representations from the image captured by the camera unit 20, the camera unit 20 remains statically located with respect to articulation of the housing 30. It should be appreciated that while the mirror assembly 10 is depicted as a full display mirror with the display module 18, in some embodiments, the mirror assembly 10 may not include the display module 18. For example, rather than communicating to a vehicle operator through the display module 18, the control system 200 may be configured to receive the image from the camera unit 20 and generate a signal to provide a notification to a vehicle operator based on the image through vehicle components other than the mirror assembly 10, such as onboard displays, audio systems, and/or the like.

The display module 18 may comprise several components, including a display 22, an optic block 24, a heat sink 26, and a primary printed circuit board (PCB) 28. The PCB 28 operates to provide electrical power and control for the components of the camera unit 20, the display module 18, and the glass element 12. The front shield 14, the rear shield 16, and components of the display module 18 include various retaining features to operably connect the several components of the display module 18 with the front shield 14, the rear shield 16, and each other, and to provide support to the display module 18. Specifically, the front shield 14 includes retaining features to operably connect the front shield 14 to the display module 18, and the rear shield 16 has retaining features to operably connect the rear shield 16 to the display module 18. The retaining features generally include snap-fit connections, tab-and-slot connections, screw connections, and other known retaining features.

The display 22 may be a liquid crystal display (LCD), a light-emitting diode (LED), an organic light-emitting diode (OLED), plasma, digital light processing (DLP), or other display technology. The display 22 further includes a flexible electrical connector 36, which is operably mechanically and electrically connected with the PCB 28. The flexible electrical connector 36 has a length L that is sufficient to extend over and wrap around the display module components between the display 22 and the PCB 28, and has a width which extends substantially along a top edge 38 of the display 22. The ends of the flexible electrical connector 36 may be chamfered to ease manufacturing. The flexible electrical connector 36, when operably coupled to the PCB 28, aids in securing the components along a top edge of the display module 18.

The glass element 12 may be part of an electro-optic assembly 35 (FIG. 3), which may include a prism-type construction or an electrochromic-type construction. In the prism-type construction, the glass element 12 may include at least two glass substrates, which may include a front substrate 42 as well as a rear substrate 44. An electro-optic medium 37 may be disposed between the front substrate 42 and the rear substrate 44. The mirror assembly 10 has a viewing area 46 disposed on a front surface of a front substrate 42. The viewing area 46 may be a rectangular shape, a trapezoidal shape, or any custom contoured shape for utilitarian and aesthetic purposes. A border of the glass element 12 may incorporate a concealing layer 48 or edge treatment, such as a chrome ring, an opaque ring, or other similar finish, to conceal a peripheral area of the front shield 14 and other elements located behind the glass element 12. A foam adhesive 50 may be connected to an inner side of the front shield 14. A pair of J-clips 52 (or other types of conductors) may electrically couple the glass element 12 to the PCB 28. In the electrochromic-type construction, the electro-optic medium 37 is an electrochromic medium, which includes at least one solvent, at least one anodic material, and at least one cathodic material. Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity changes from a first phase to a second phase.

The electrochromic component as disclosed herein may be a single-layer, single-phase component, multi-layer component, or multi-phase component, as described in U.S. Pat. Nos. 5,928,572 entitled "Electrochromic Layer and Devices Comprising Same," 5,998,617 entitled "Electrochromic Compounds," 6,020,987 entitled "Electrochromic Medium Capable of Producing a Pre-selected Color," 6,037,471 entitled "Electrochromic Compounds," 6,141,137 entitled "Electrochromic Media for Producing a Pre-selected Color," 6,241,916 entitled "Electrochromic System," 6,193,912 entitled "Near Infrared-Absorbing Electrochromic Compounds and Devices Comprising Same," 6,249,369 entitled "Coupled Electrochromic Compounds With Photostable Dication Oxidation States," 6,137,620 entitled "Electrochromic Media With Concentration Enhanced Stability, Process For The Preparation Thereof and Use in Electrochromic Devices," and 6,519,072 entitled "Electrochromic Device"; and International Patent Application Publication Nos. WO 98/42796 entitled "Electrochromic Polymeric Solid Films, Manufacturing Electrochromic Devices Using Such Solid Films, and Processes for Making Such Solid Films and Devices," and WO 99/02621 entitled "Electrochromic Polymer System," which are herein incorporated by reference in their entirety. The glass element 12 may also be any other element having partially reflective, partially transmissive properties. To provide electric current to the glass element 12, electrical elements (e.g., a bus tape) may be provided on opposing sides of the element, to generate an electrical potential therebetween.

With continued reference to FIGS. 1 and 2, the camera unit 20 is electrically coupled to the PCB 28 via a flexible conductor 54 and the PCB 28 controls functionality of the camera unit 20. More particularly, the flexible conductor 54 may be connected to the PCB 28 by a PCB connector 56 and the flexible conductor 54 may be connected to the camera unit 20 by a camera connector 58. The connectors 56, 58 can include any kind of electrical connectors including AC, DC connectors, Bayonet Neill-Concelman ("BNC") connectors, board-to-board connectors, cable to board connectors, and other types of connections used in the art. In some embodiments, the PCB connector 56 and/or the camera connector 58 may be permanent, selectively attached, and/or combinations thereof.

In some embodiments, the rear shield 16 may define a first conductor aperture 60 and the housing 30 may include a second conductor aperture 62 generally aligned with the first conductor aperture 60. In some embodiments, the first conductor aperture 60 and the second conductor aperture 62 may be located inwardly from a periphery of the rear shield 16 and the housing 30 such that it aligns generally rearward of the mirror assembly 10. In some embodiments, the first conductor aperture 60 and the second conductor aperture 62 may be located on or adjacent to a periphery of the rear shield 16 and the housing 30 such that it aligns generally downwardly, upwardly, or in a cross-car direction of the mirror assembly 10. In some embodiments, the first conductor aperture 60 and the second conductor aperture 62 may be sized to permit the flexible conductor 54 and not the PCB connector 56 and/or the camera connector 58. During assembly, mechanical fasteners 64 may connect the components of the mirror assembly 10. In some embodiments, the flexible conductor 54 may extend through the housing 30 and a hollow interior 66 of the mounting member 32.

As best illustrated in FIG. 1, the camera unit 20 may include at least one camera 68 (e.g., a single camera, a pair of cameras, several cameras) for capturing images from at least one orientation of an interior cabin of the vehicle that is received by the PCB 28 (e.g., the control system 200). The camera unit 20 may include a variety of image-capturing technology including night mode, image enhancement, thermal recognition, recording capabilities, wide angle lenses, and other types of technologies. The camera unit 20 may further include at least one illumination element 70. In some embodiments, the illumination elements 70 may include infrared emitters for transmitting infrared wavelengths of light, LEDs, and/or other light sources. In some embodiments, the illumination elements 70 are configured to emit a structured light pattern and the control system 200 is configured to extract a depth from images of the structured light. In the illustrated embodiment in FIG. 1, the camera unit 20 may be configured to be mounted to an interior of the vehicle, for example, the camera unit 20 may be configured to monitor the interior cabin of the vehicle. As such, the vehicle may be a passenger carrying vehicle, such as a commercial or residential automobile, aircraft, and/or other passenger vessel where monitoring environmental activity may be beneficial. It should be appreciated that the at least one camera 68 may include a plurality of cameras 68 mounted to various locations and oriented towards the interior cabin (e.g., at least two cameras oriented towards different passengers, the driver, or other locations). In embodiments with at least two cameras 68, the control system 200 may be configured to extract a depth of the interior cabin under the principles of stereovision. At least one image capturing device (not shown) may also be located in a rearward of the vehicle for capturing images of other drivers or environmental conditions.

With reference to FIGS. 1 and 2, the flexible conductor 54 may include a length selected for the location on the vehicle on which the camera unit 20 is ultimately attached. The mount plate 34 may be connectable directly to a vehicle bracket 72 (FIG. 1) and/or a windshield via a windshield button 74. More particularly, the vehicle bracket 72 may include a body 76 that extends to a periphery 78. The body 76 may be generally planar or shaped to match a contour of an interior of the vehicle, such as an overhead area or a front window. The vehicle bracket 72 may include a pocket wall 80 extending outwardly from the body 76 to form a seat 77 (FIG. 6) for locating the camera unit 20. The camera unit 20 may further include a camera plate 82 that orients and statically holds the at least one camera 68 relative to the illumination elements 70 and/or in a direction with respect to the vehicle. The camera plate 82 may define a series of apertures for accommodating portions of the camera unit 20 (e.g., the camera 68 and the illumination elements 70). The camera plate 82 may be configured to orient the illumination element 70 co-planar with the camera 68 or at least two opposing angles to illuminate wider areas of a vehicle cabin. Given the flexibility of the design, it should be appreciated that the camera unit 20 may also be connected or attached in other locations by the OEM, such as, but not limited to, a windshield bracket, the mounting member 32, the mount plate 34, the windshield button 74, a rearward facing camera bracket, a moveable holder that permits reorientation, or any type of mount. In embodiments where the camera unit 20 is connected to the windshield button 74, the camera unit 20 may include a track-type mechanism for sliding engagement with the windshield button 74 as is typically used for rearview mirrors on the mount plate 34.

With continued reference to FIGS. 1 and 2, a glare sensor optic 84 (FIG. 2) is provided on a front side of the optic block 24, in a location which receives light through the glass element 12, and which is not behind the display 22. The glare sensor optic 84 may be snap-fit into a receiving aperture 86 in the optic block 24. The glare sensor optic 84 receives light from headlamps of a trailing vehicle, and measures information regarding the likely glare visible on the glass element 12 and communicates this information to the mirror assembly 10 so that the mirror assembly 10 can be optimized to allow viewing of the display 22 through the glass element 12. The glare sensor optic's 84 optical vertical/horizontal pattern is symmetrical, so that orientation of the glare sensor optic 84 is not significant as shown in its circular geometry. The glare sensor optic 84 could also have an asymmetrical vertical/horizontal light gathering pattern, in which case a keyed feature would be put into the lens to verify correct orientation in the mirror assembly 10. The glare sensor optic 84 could also be packaged at least partially within the housing 30 of the mirror assembly 10 and have a light guide which is configured to propagate light to the glare sensor optic 84. The glare sensor optic 84 could also be an imager on a rear portion of the vehicle, where a signal representative of the received light is communicated from the glare sensor optic 84 to the mirror assembly 10.

With continued reference to FIGS. 1 and 2, the mirror assembly 10 may be articulated between a plurality of positions. The mirror assembly 10 is considered "on axis" when a line perpendicular to the plane of the glass element 12 extends toward the eyes of a viewer. Due to the display 22 being viewed through the glass element 12, any glare on the glass element 12 may interfere with the visibility of the display 22. When the mirror assembly 10 is on axis and is being used during night time driving conditions, headlights from a trailing vehicle (i.e., a vehicle driving behind the vehicle with the mirror assembly 10) are captured by the at least one image capturing device (not shown) that is located in a rearward of the vehicle for capturing images of other drivers or environmental conditions.

In some embodiments, an actuator device 88 (FIG. 2) is operably coupled to the mirror assembly 10. When actuated, the actuator device 88 articulates the glass element 12 off axis (i.e., away from a direct line toward the driver's eyes). Typically, actuation of the actuator device 88 tilts the glass element 12 upwards, to move the mirror to an off-axis position. However, it should be appreciated that the actuator device 88 can be configured to move the mirror in any direction with respect to the axis. The actuator device 88 can also be configured to move the display 22 upon activation. The actuator device 88 can also be configured to turn the display 22 on or off. Thus, when the actuator device 88 is actuated to move the mirror off axis, the display 22 can be turned off. Typically, when the actuator device 88 is actuated, the mirror assembly 10 rotates with the glass element 12 and the display 22, keeping a constant distance relationship to each other. When the actuator device 88 is activated, the mounting member 32 and mount plate 34 do not move with respect to the rest of the vehicle. In the illustrated embodiment, the glass element 12 and the display 22 are rigidly affixed to each other and do not move independently of one another. Alternatively, the glass element 12 could be configured to move independently of the display 22. In some embodiments, the control system 200 is configured to generate information related to the image captured by the camera unit 20. For example, the information generated by the control system 200 may include a recommendation to the driver, such as detected signs of drowsiness, distraction, the presence or absence of objects, and/or the like. The information may be generated as an audible warning or visually on the display 22 and visible on the viewing area 46. In some embodiments, the display 22 may be configured to provide a graphical overlay over the glass element 12. The present disclosure may be used with a display mirror system such as that described in U.S. Pat. Nos. 9,505,349 and 10,739,591, which are hereby incorporated herein by reference in their entirety.

Figure 3:
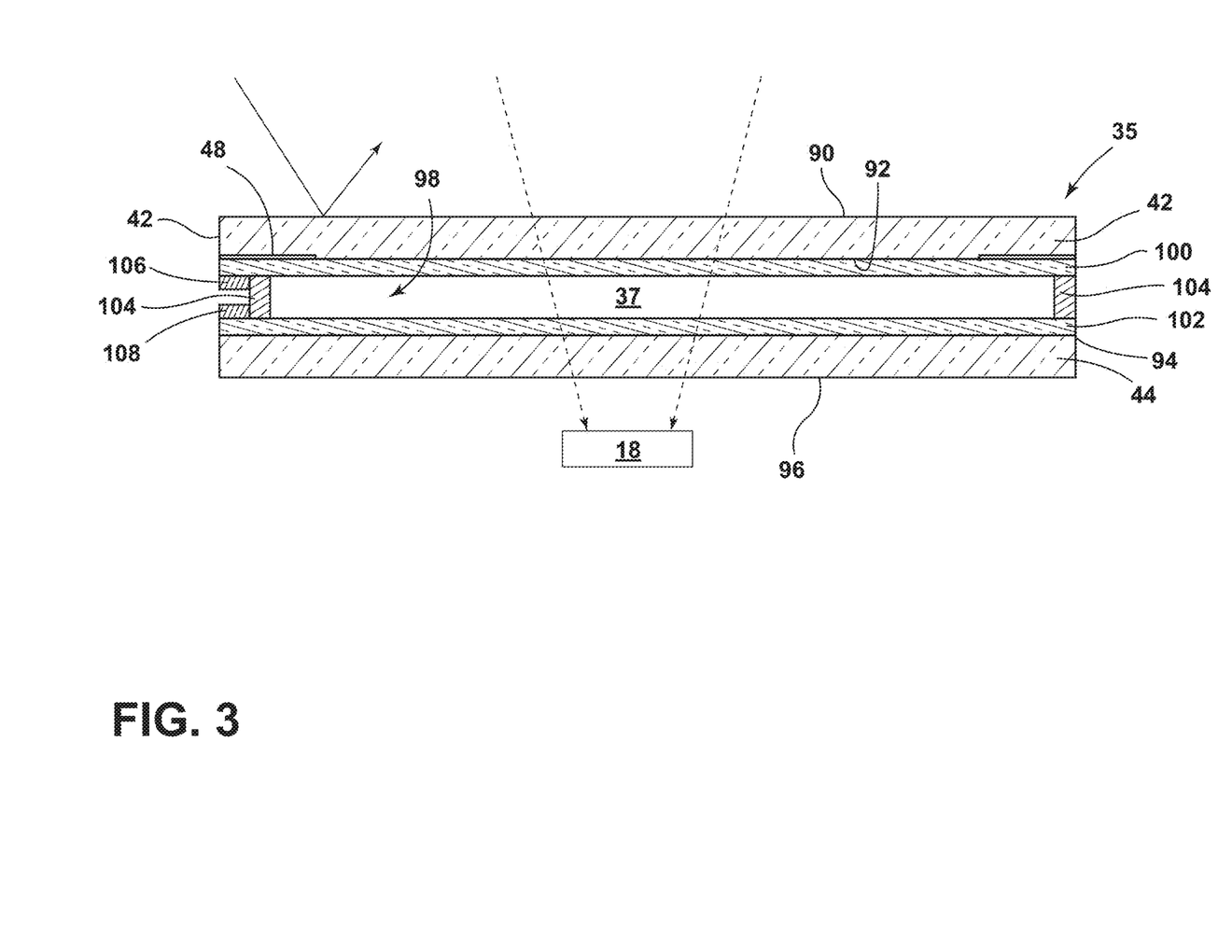
FIG. 3 is a cross-sectional view of an electro-optic assembly in accordance with an aspect of the present disclosure.

With reference now to FIG. 3, the electro-optic assembly 35 may be a single-layer component, a single-phase component, a multi-layer component, and/or a multi-phase component that can be switched between the reflective state and the partially transmissive state (e.g., to view the display 22). The electro-optic assembly 35 includes the front substrate 42 that has a first surface 90 and a second surface 92 opposite the first surface 90. The rear substrate 44 has a third surface 94 and a fourth surface 96 opposite the third surface 94. The second and third surfaces 92, 94 face each other to define a gap 98. A first electrode 100 is coupled to the second surface 92, and a second electrode 102 is coupled to the third surface 94. The electro-optic medium 37 is located between the first electrode 100 and the second electrode 102. The electro-optic medium 37 may be retained within the gap 98 via a seal 104. A first electrical bus 106 may be connected to the first electrode 100 and a second electrical bus 108 may be connected to the second electrode 102. More particularly, the electrical buses 106, 108 may provide current to the electrodes 100, 102 via the flexible conductor 54. The display module 18 is located on a rear side of the electro-optic assembly 35 (e.g., on a side of the electro-optic assembly 35 opposite of the viewer).

Figure 4:
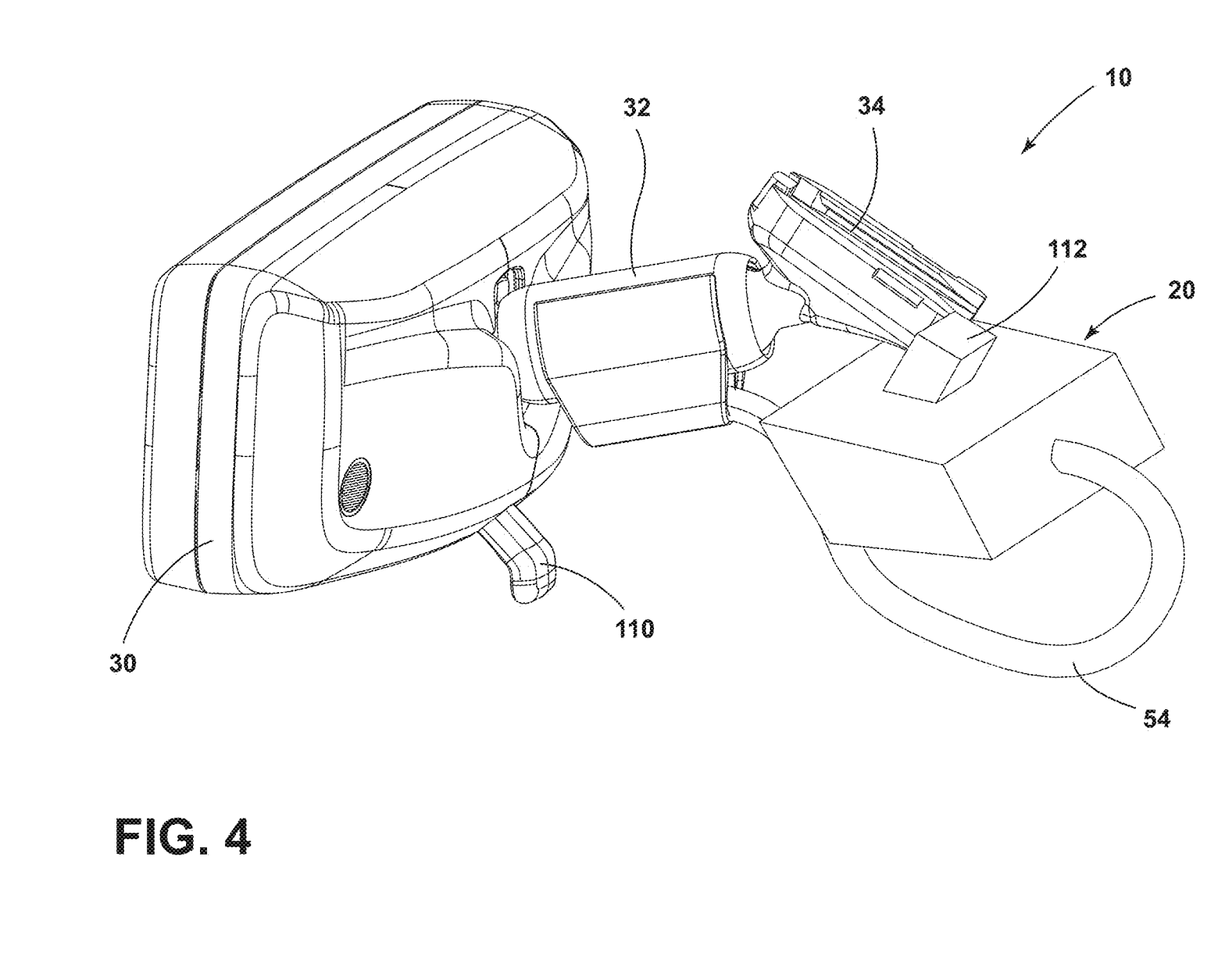
FIG. 4 is a rear perspective view of a mirror assembly in accordance with an aspect of the present disclosure.

With reference now to FIG. 4, the mirror assembly 10 may include an external bi-modal switch 110 configured to at least one of activate and deactivate the display module 18 and/or articulate the glass element 12. In some embodiments, the control system 200 that dictates functionality of the camera unit 20 and the display module 18 may be located on the PCB 28 (e.g., a singular PCB). In some embodiments, the control system 200 may include a second PCB (not shown) that is located in the housing 30 and/or in the camera unit 20 and dictates functionality of the camera unit 20. In this manner, the mirror assembly 10 may be assembled at one location and transported to a different location as a complete unit. During transportation, the camera unit 20 may be statically coupled with another component of the mirror assembly 10. For example, a connection device 112 may temporarily connect the camera unit 20 to the housing 30, the mounting member 32, and/or the mount plate 34. In some embodiments, the connection device 112 may include male-female, snap-fit connectors (e.g., fasteners or clips) attached to the camera unit 20 and the other component of the mirror assembly 10. In some embodiments, the connection device 112 may include an adhesive, a tie, and/or a tape.

Figure 5:
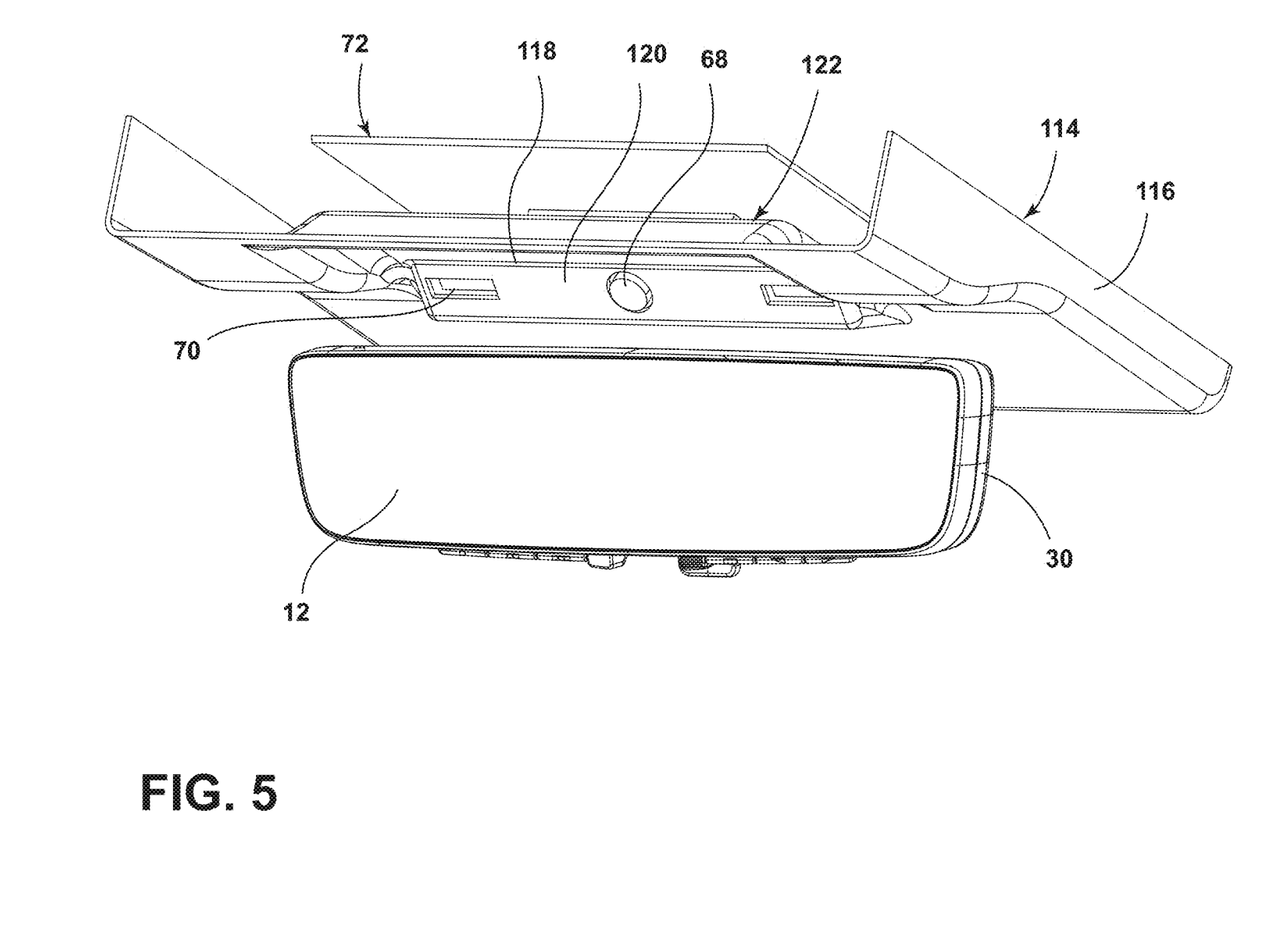
FIG. 5 is a front perspective view of a mirror assembly with a windshield cover in accordance with an aspect of the present disclosure.
Figure 6:
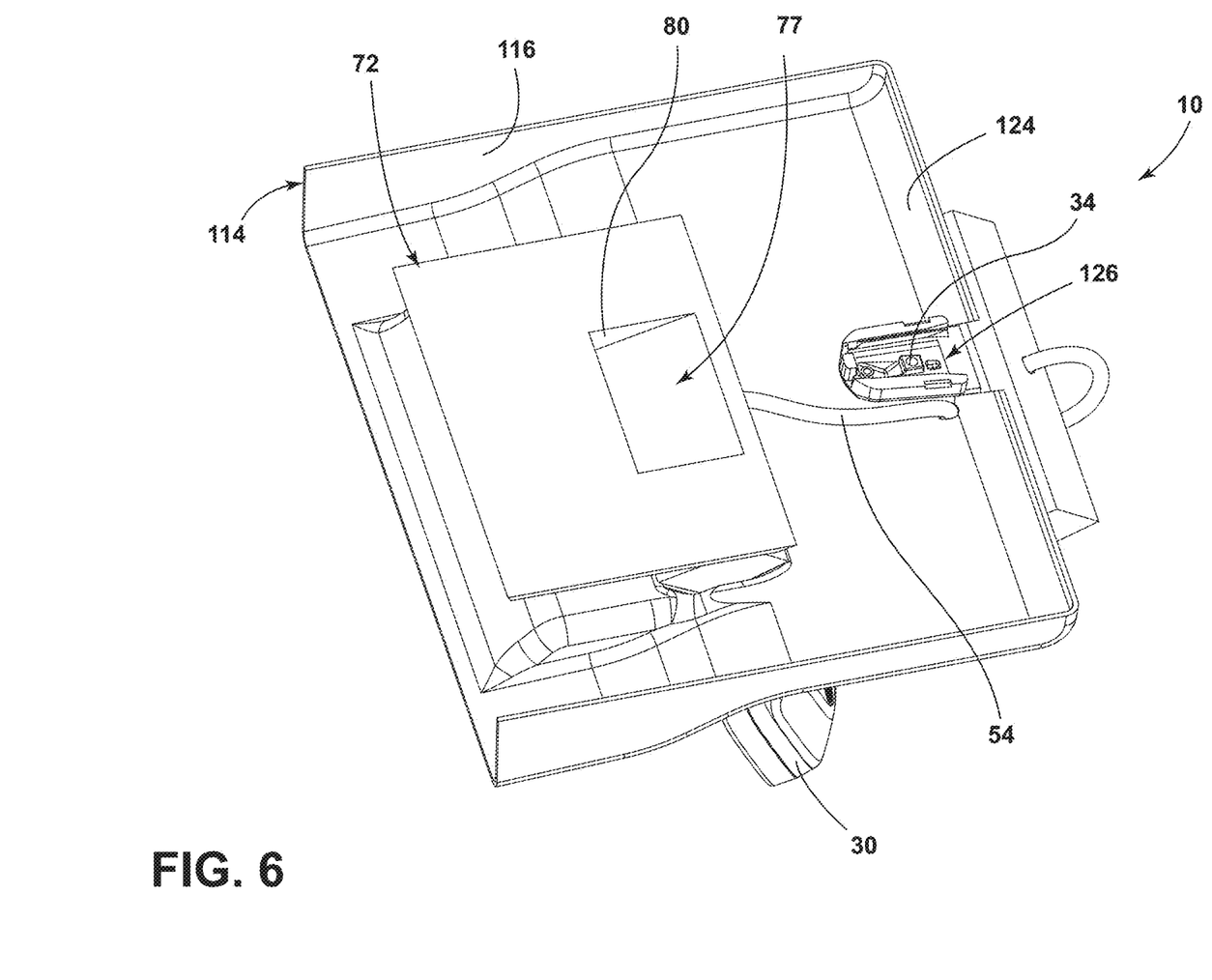
FIG. 6 is a top perspective view of a mirror assembly with a windshield cover in accordance with an aspect of the present disclosure.
Figure 7:
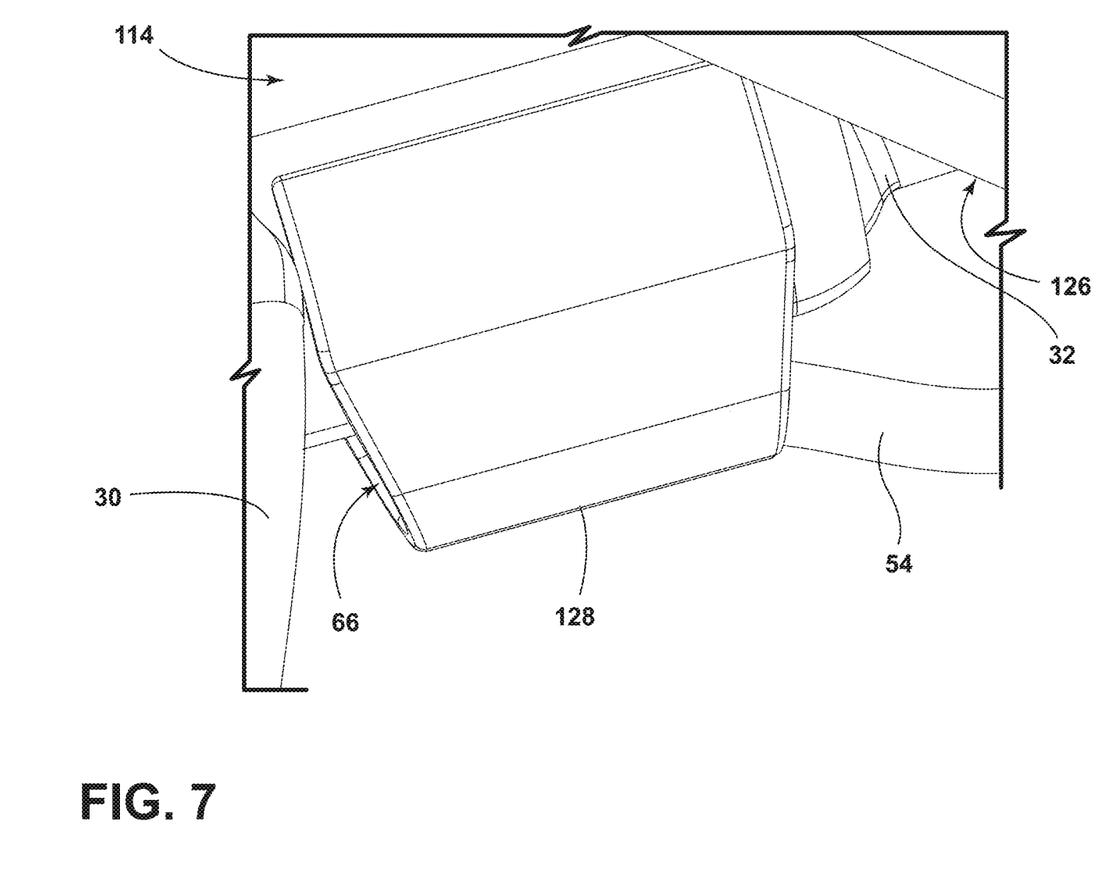
FIG. 7 is an enlarged side view of a mounting member for a mirror assembly with a windshield cover in accordance with an aspect of the present disclosure.

With reference now to FIGS. 5-7, a windshield cover 114 is illustrated that fits over and substantially covers the vehicle bracket 72 and camera unit 20. The windshield cover 114 may include a pair of opposing sidewalls 116 that extend upwardly to conceal the vehicle bracket 72 from opposite sides. The windshield cover 114 may define a depression 118, which may be located centrally and match the contour of at least a portion of the camera plate 82. In this manner, the camera unit 20 may be located in the seat of the vehicle bracket 72 and the camera plate 82 may be connected to the pocket wall 80 of the vehicle bracket 72. The camera plate 82 and the pocket wall 80 may then be aligned with the depression 118. The depression 118 may include an angled front wall 120 that orients the camera unit 20 towards the interior cabin and the depression 118 may define a clearance for projected light from the illumination elements 70 and a field-of-view of the camera 68. The angled front wall 120 may define one or more apertures 122 to permit the camera 68 and illumination elements 70 to project therethrough. The camera plate 82 and/or the vehicle bracket 72 may be connected to the windshield cover 114 with mechanical fasteners, adhesives, or the like. Interior molding may be placed around portions of the windshield cover 114 once installed. As best illustrated in FIG. 6, a rear edge 124 of the windshield cover 114 may define a slot 126 and the mounting member 32 and/or mount plate 34 may be located in the slot 126. The flexible conductor 54 may extend through the slot 126 between the housing 30 and the camera unit 20. In FIG. 7, the mounting member 32 is illustrated with an exterior collar 128 that defines the hollow interior 66 for guiding and obscuring the flexible conductor 54.

The present disclosure may be used with a mounting system, such as that described in U.S. Pat. Nos. 9,244,249; 8,960,629; 8,814,373; 8,201,800; 8,210,695; 9,174,577; 8,925,891; and 9,838,653; and U.S. Provisional Patent Application No. 61/704,869, which are hereby incorporated herein by reference in their entirety. Further, the present disclosure may be used with a rearview packaging assembly, such as that described in U.S. Pat. Nos. 9,316,347; 8,814,373; 8,646,924; 8,643,931; 8,264,761; and 8,885,240; and U.S. Provisional Patent Application No. 61/707,625, which are hereby incorporated herein by reference in their entirety. Additionally, it is contemplated that the present disclosure can include a bezel, such as that described in U.S. Pat. Nos. 8,827,517; 8,210,695; and 8,201,800, which are hereby incorporated herein by reference in their entirety.

Figure 8:
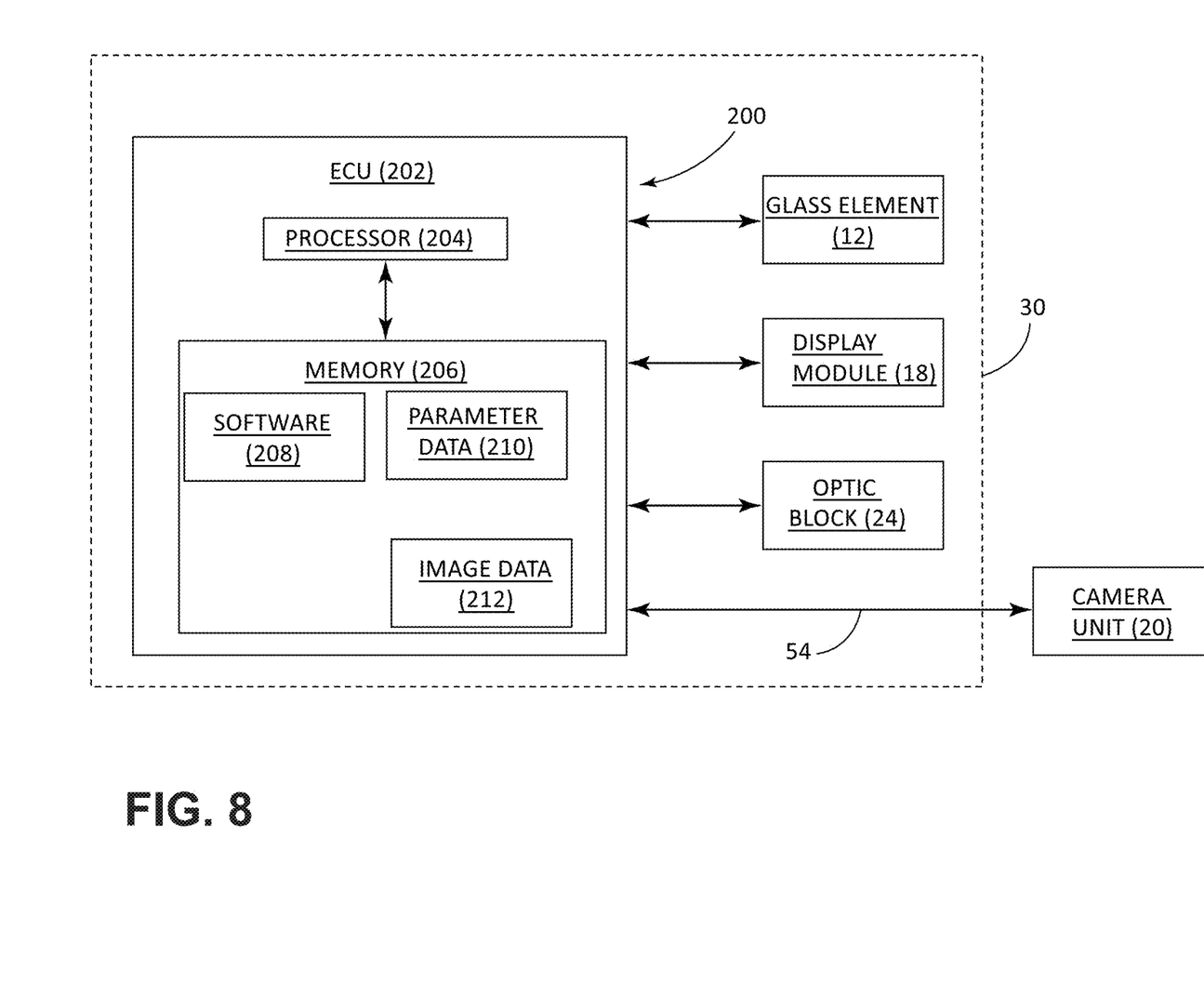
FIG. 8 schematically illustrates a control system for a mirror assembly in accordance with an aspect of the present disclosure.

FIG. 8 illustrates a control system 200 associated with the one or more PCBs in the housing 30 and/or the camera unit 20. The control system 200 may include an electronic control unit (ECU) 202. The ECU 202 may include a processor 204 and a memory 206. The processor 204 may include any suitable processor 204. Additionally, or alternatively, the ECU 202 may include any suitable number of processors, in addition to or other than the processor 204. The memory 206 may comprise a single disk or a plurality of disks (e.g., hard drives), and includes a storage management module that manages one or more partitions within the memory 206. In some embodiments, the memory 206 may include flash memory, semiconductor (solid state) memory, or the like. The memory 206 may include Random Access Memory (RAM), a Read-Only Memory (ROM), or a combination thereof. The memory 206 may include instructions that, when executed by the processor 204, cause the processor 204 to, at least, perform the functions associated with the components of the mirror assembly 10. The glass element 12 (e.g., the electro-optic assembly 35), the display module 18, the camera unit 20, and the optic block 24 may, therefore, be controlled by the ECU 202. The ECU 202 may be located in the housing 30 or in a combination of the housing 30 and the camera unit 20. The memory 206 may, therefore, include software 208, parameter data 210, and image data 212 (e.g., images) captured by the camera unit 20. The parameter data 210 may include parameters for monitoring an environment and/or occupant of the vehicle based on the image data 212. For example, the parameter data 210 may include instructions to extract depth information from the image data 212 to develop a 3D representation of the interior cabin. The software 208 may include instructions to generate information to the driver, such as a warning or recommendation (e.g., graphically on the display module 18) based on a condition in the interior cabin (e.g., a sign of drowsiness or distraction).

Accordingly, in some embodiments, the ECU 202 may be located in the housing 30 and the camera unit 20 may be located outside of the housing 30, where the ECU 202 is configured to operate various functionalities of the camera unit 20. For example, the processor 204 may be configured to turn the camera unit 20 on and off, instruct the camera unit 20 to capture the image data 212 in ambient lighting conditions, turn on and off the illumination elements 70, capture the image data 212 in infrared illumination, etc. In some embodiments, the ECU 202 may further be configured to also operate various functionalities of the glass element 12 (e.g., sourcing power to the electro-optic medium 37), the display module 18 (e.g., displaying image information), and the optic block 24 (e.g., removing glare as sensed from the glare sensor optic 84). Therefore, in some embodiments, the ECU 202 may be configured to receive, upon a request to camera unit 20, image data 212, and compare the image data 212 to defined parameters in the parameter data 210, and to extrapolate and relay (e.g., via the software 208) at least one image information. For example, the captured image data 212 may include that a driver and/or a passenger is using a mobile electronic device, is exhibiting signs of drowsiness, distraction, medical symptoms, and/or is sitting in an unsafe position within the interior cabin. The image data 212 may also include certain types of redundant information that is typically observed through other components of a vehicle, such as a passenger or driver that is not wearing a seatbelt. The image data 212 may then be reviewed via instructions in the parameter data 210 to identify any notable unsafe conditions and relay that information as an auditory or graphical message on the display module 18. The information related may, therefore, be a recommendation that is displayed on the display module 18 as a textual or a non-textual indicia. In some embodiments, an auditory alert may accompany the graphical message that is displayed on the display module.

Figure 9:
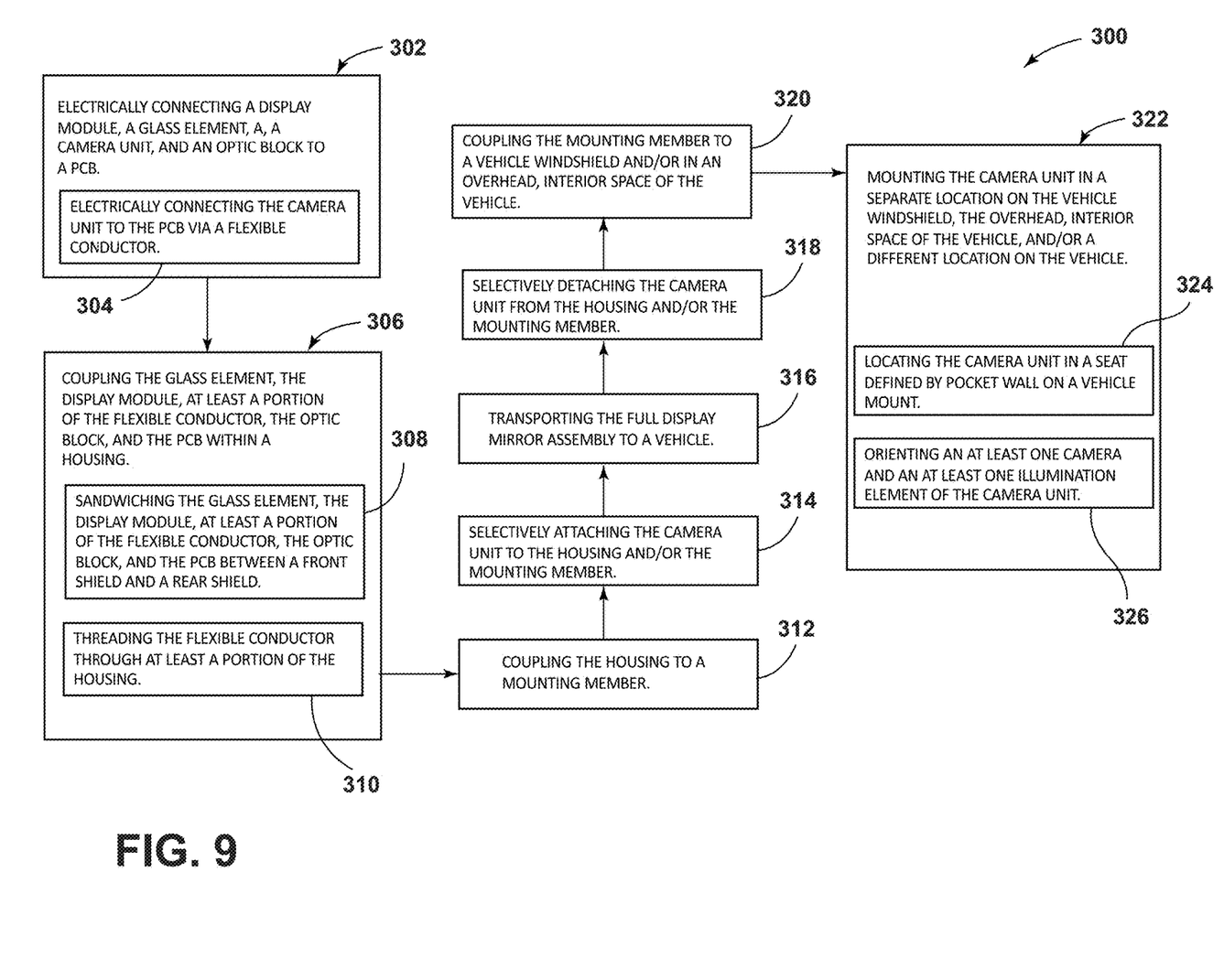
FIG. 9 is a method of assembling a mirror assembly and attaching the mirror assembly to a vehicle in accordance with an aspect of the present disclosure.

FIG. 9 illustrates a method 300 of assembling the mirror assembly and coupling it to a vehicle. At 302, the method 300 includes electrically connecting a glass element, a display module, a camera unit, and an optic block to a PCB. Step 302 may further include, at 304, electrically connecting the camera unit to the PCB via a flexible conductor. At 306, the method 300 includes coupling the glass element, the display module, at least a portion of the flexible conductor, the optic block, and the PCB and enclosing them within a housing. Step 306 may further include, at 308, sandwiching the glass element, the display module, at least a portion of the flexible conductor, the optic block, and the PCB between a front shield and a rear shield. Step 306 may further include yet, at 310, threading the flexible conductor through at least a portion of the housing. At 312, the method 300 includes coupling the housing to a mounting member. At 314, the method 300 includes selectively attaching the camera unit to the housing and/or the mounting member. At 316, the method 300 includes transporting the mirror assembly to a vehicle. At 318, the method 300 includes selectively detaching the camera unit from the housing and/or the mounting member. At 320, the method includes coupling the mounting member to a vehicle windshield and/or in an overhead, interior space of the vehicle. At 322, the method includes mounting the camera unit in a separate location on the vehicle windshield, the windshield button, the mount member, an exterior of the housing, an overhead interior space of the vehicle, and/or a different location on the vehicle. Step 322 may include, at 324, locating the camera unit in a seat defined by a pocket wall on a vehicle mount. Step 322 may further include, at 326, orienting an at least one camera and an at least one illumination element of the camera unit, for example, out of apertures defined by the pocket wall.

It should be appreciated that the flexible design of the mirror assembly 10 with a single ECU 202 reduces the number of ECUs typically needed for camera units 20 located outside of a housing 30. Moreover, the single ECU design reduces the number of required wire harness connections and allows the mirror assembly 10 to be shipped with the camera unit 20 temporarily attached, reducing on-site errors during attachment to a vehicle.

The invention disclosed herein is further summarized in the following paragraphs and is further characterized by combinations of any and all of the various aspects described therein.

According to one aspect of the present disclosure, a mirror assembly for a vehicle includes a housing and an electro-optic assembly located in the housing. The electro-optic assembly includes a partially reflective, partially transmissive front substrate. The front substrate defines a first surface and a second surface. A rear substrate defines a third surface and a fourth surface. An electro-optic medium is disposed between the front substrate and the rear substrate. A display module is located in the housing and a camera unit is located outside the housing and includes a camera. The camera is configured to capture at least one image. An ECU is located in the housing and is configured to send instructions to the camera to capture the image and to generate information about the image on the display module. A flexible conductor is at least partially located in the housing and electrically coupled between the ECU and the camera.

According to another aspect, a housing is moveable relative to the camera unit.

According to another aspect, a mounting member is configured to attach a mirror assembly to a windshield or overhead space of a vehicle, where the mounting member includes a hollow interior and a flexible conductor is at least partially located in the hollow interior.

According to another aspect, a camera unit is spaced from a housing.

According to another aspect, a camera unit includes at least one illumination element.

According to another aspect, an at least one illumination element includes an infrared emitter.

According to another aspect, a connection device is located on a camera unit and at least one of a mounting member and a housing.

According to another aspect, an ECU comprises a processor and a memory including instructions that, when executed by the processor, cause the processor to capture an image with a camera unit, and display the image information on a display module.

According to another aspect, the memory further causes the processor to turn on an at least one illumination element of a camera unit and switch the camera unit into a night mode for capturing an image within infrared wavelengths of light.

According to another aspect, a flexible conductor includes a length that permits a camera unit to be attached above a housing in an overhead space of a vehicle.

According to another aspect, a camera unit is oriented to capture an interior cabin of a vehicle.

According to another aspect of the present disclosure, a mirror assembly for a vehicle includes a housing and an electro-optic assembly is located in the housing. The electro-optic assembly includes a partially reflective, partially transmissive front substrate. The front substrate defines a first surface and a second surface. A rear substrate defines a third surface and a fourth surface. An electro-optic medium is disposed between the front substrate and the rear substrate. A vehicle bracket is spaced from the housing and includes a pocket wall defining a seat. A camera unit is located in the seat and includes a camera and an illumination element. The illumination element is configured to project a light in an infrared spectrum and the camera is configured to capture an image within the infrared spectrum. An ECU is located in the housing and is configured to receive the image from the camera unit and generate a signal to provide a notification to a vehicle operator based on the image. A flexible conductor is at least partially located in the housing and electrically coupled between the ECU and the camera.

According to another aspect, a mounting member is configured to attach a mirror assembly to a windshield or overhead space of a vehicle. The mounting member includes a hollow interior and a flexible conductor is at least partially located in the hollow interior.

According to another aspect, a windshield cover includes opposing sidewalls and an angled front wall partially defining a depression that is located between the opposing sidewalls. A vehicle bracket is located between the opposing sidewalls and a seat and a camera unit are located proximate an angled front wall.

According to another aspect, a windshield cover defines at least one aperture in an angled front wall aligned with a camera and an illumination element.

According to another aspect, the at least one aperture includes a first aperture aligned with a camera and a second aperture aligned with an illumination element.

According to another aspect, a windshield cover defines a port and a mounting member extends through the port.

According to yet another aspect of the disclosure, a mirror assembly for a vehicle includes a housing and an electro-optic assembly is located in the housing. The electro-optic assembly includes a partially reflective, partially transmissive front substrate. The front substrate defines a first surface and a second surface. A rear substrate defines a third surface and a fourth surface. An electro-optic medium is disposed between the front substrate and the rear substrate. A camera unit is located outside of the housing and includes a camera that is configured to capture an image. An ECU is located in the housing and is configured to receive the image from the camera unit and generate a signal to provide a notification to a vehicle operator based on the image. A flexible conductor is at least partially located in the housing and electrically coupled between the ECU and the camera. A mounting member is configured to attach the mirror assembly to a windshield or overhead space of a vehicle. The mounting member includes a hollow interior and the flexible conductor is at least partially located in the hollow interior.

According to another aspect, a connection device is located on a camera unit and at least one of a mounting member and a housing for selectively connecting the camera unit to the housing or mounting member.

According to another aspect, the connection device includes at least one of a fastener, clip, adhesive, tie, or tape.

According to another aspect, a method of assembling a mirror assembly and coupling the mirror assembly to a vehicle is provided. The method comprises the steps of electrically connecting a glass element, a display module, and a camera unit to a PCB. The camera unit is connected to the PCB by a flexible conductor and encloses the PCB, the glass element, the display module, and at least a portion of the flexible conductor within the housing, where the camera unit is located outside of the housing.

According to another aspect, the method includes coupling the camera unit to the housing and transporting the mirror assembly to a vehicle location.

According to another aspect, the step of coupling the camera unit to the housing includes connecting the camera unit to a mounting member that is connected to the housing.

According to another aspect, the method includes detaching the camera unit from the housing, connecting the housing in a first location within an interior of a vehicle, and connection of the camera unit in a second location within the interior of the vehicle that is spaced from the first location.

It will be appreciated that embodiments of the disclosure described herein may be comprised of one or more conventional processors and unique stored program instructions that control one or more processors to implement, in conjunction with certain non-processor circuits, some, most, or all of the functions of a mirror assembly 10, as described herein. The non-processor circuits may include, but are not limited to, signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A mirror assembly for a vehicle, the mirror assembly comprising:
    a housing;
    a mounting member configured to attach the mirror assembly to a windshield or overhead space of a vehicle;
    an electro-optic assembly in the housing, the electro-optic assembly including:
        a partially reflective, partially transmissive front substrate, the front substrate defining a first surface and a second surface;
        a rear substrate defining a third surface and a fourth surface; and
        an electro-optic medium disposed between the front substrate and the rear substrate;
    a display module located in the housing;
    a camera unit located outside the housing and the mounting member and including a camera, the camera configured to capture an image;
    an electronic control unit ("ECU") located in the housing and configured to send instructions to the camera to capture the image and to generate information about the image on the display module; and
    a flexible conductor at least partially located in the housing and electrically coupled between the ECU and the camera.

2. The mirror assembly of claim 1, wherein the housing is moveable relative to the camera unit.

3. The mirror assembly of claim 1, wherein the mounting member includes a hollow interior and the flexible conductor extends through the hollow interior to the camera unit.

4. The mirror assembly of claim 1, wherein the camera unit is spaced from the housing and the mounting member.

5. The mirror assembly of claim 1, wherein the camera unit includes at least one illumination element.

6. The mirror assembly of claim 5, wherein the at least one illumination element includes an infrared emitter.

7. The mirror assembly of claim 6, further comprising:
a connection device located on the camera unit and at least one of a mounting member and the housing for selectively connecting the camera unit to the housing or mounting member.

8. The mirror assembly of claim 1, wherein the ECU comprises:
a processor; and
a memory including instructions that, when executed by the processor, cause the processor to:
capture the image with the camera unit; and
display the image on the display module.

9. The mirror assembly of claim 8, wherein the memory further causes the processor to:
turn on an at least one illumination element of the camera unit; and
switch the camera unit into a night mode for capturing the image within infrared wavelengths of light.

10. The mirror assembly of claim 1, wherein the flexible conductor includes a length that permits the camera unit to be attached above the housing in an overhead space of a vehicle.

11. A vehicle including a mirror assembly of claim 1, wherein the camera unit is oriented to capture an interior cabin of the vehicle.

12. A mirror assembly for a vehicle, the mirror assembly comprising:
a housing;
an electro-optic assembly in the housing, the electro-optic assembly including:
a partially reflective, partially transmissive front substrate, the front substrate defining a first surface and a second surface;
a rear substrate defining a third surface and a fourth surface; and
an electro-optic medium disposed between the front substrate and the rear substrate;
a vehicle bracket outside of the housing and including a body and a pocket wall extending outwardly from the body and defining a seat;
a camera unit located in the seat and including a camera and an illumination element, the illumination element is configured to project a light in an infrared spectrum, and the camera is configured to capture an image within the infrared spectrum;
a camera plate coupled to the vehicle bracket and defining a series of apertures for orienting and statically holding the camera relative to the illumination element;
an electronic control unit ("ECU") located in the housing and configured to receive the image and generate a signal to provide a notification to a vehicle operator based on the image; and
a flexible conductor at least partially located in the housing and electrically coupled between the ECU and the camera.

13. The mirror assembly of claim 12, further comprising:
a mounting member spaced from the seat and configured to attach the mirror assembly to a windshield or overhead space of a vehicle, wherein the mounting member includes a hollow interior and the flexible conductor is at least partially located in the hollow interior.

14. The mirror assembly of claim 12, further comprising:
a windshield cover including opposing sidewalls and an angled front wall partially defining a depression located between the opposing sidewalls, the depression matching a contour of the camera plate; and
wherein the vehicle bracket is located between the opposing sidewalls and the seat and the camera unit are located proximate the angled front wall.

15. The mirror assembly of claim 14, wherein the windshield cover defines at least one aperture in the front wall aligned with the camera and the illumination element.

16. The mirror assembly of claim 15, wherein the at least one aperture includes a first aperture aligned with the camera and a second aperture aligned with the illumination element.

17. The mirror assembly of claim 14, wherein the windshield cover defines a port and a mounting member extends through the port.

18. A mirror assembly for a vehicle, the mirror assembly comprising:
a housing;
an electro-optic assembly in the housing, the electro-optic assembly including:
a partially reflective, partially transmissive front substrate, the front substrate defining a first surface and a second surface;
a rear substrate defining a third surface and a fourth surface; and
an electro-optic medium disposed between the front substrate and the rear substrate;
a camera unit located outside the housing and including a camera, the camera configured to capture an image;
an electronic control unit ("ECU") located in the housing and configured to receive the image and generate a signal to provide a notification to a vehicle operator based on the image;
a flexible conductor at least partially located in the housing and electrically coupled between the ECU and the camera; and
a mounting member spaced from the camera unit and configured to attach the mirror assembly to a windshield or overhead space of a vehicle, wherein the mounting member includes a hollow interior and the flexible conductor is at least partially located in the hollow interior and extends from the mounting member to the camera unit.

19. The mirror assembly of claim 18, further comprising:
a connection device located on the camera unit and at least one of a mounting member and the housing for selectively connecting the camera unit to the housing or mounting member.

20. The mirror assembly of claim 19, wherein the connection device includes at least one of a fastener, clip, adhesive, tie, or tape.

* * * * *